United States Patent [19]

Hammer

[11] 4,344,995
[45] Aug. 17, 1982

[54] HYBRID COMPOSITE STRUCTURES

[75] Inventor: Robert H. Hammer, Kirkland, Wash.

[73] Assignee: The Boeing Company, Seattle, Wash.

[21] Appl. No.: 187,247

[22] Filed: Sep. 15, 1980

[51] Int. Cl.³ .................. B32B 3/12; B32B 23/02; B32B 3/10
[52] U.S. Cl. .................. 428/61; 156/254; 156/297; 156/304.1; 156/304.3; 156/307.1; 244/117 R; 244/131; 244/133; 428/116; 428/119; 428/137; 428/138; 428/156; 428/192; 428/408; 428/902
[58] Field of Search .............. 428/57, 58, 61, 116, 428/118, 119, 120, 138, 367, 902, 408; 244/117 R, 121, 131–133, 123, 125; 156/297, 254, 304.1, 304.3, 307.1

[56] References Cited

U.S. PATENT DOCUMENTS

| 2,696,451 | 12/1954 | Snyder | 244/129.3 |
| 3,145,000 | 8/1964 | Mackie | 428/116 |
| 3,655,818 | 4/1972 | McKown | 428/116 |
| 3,919,022 | 11/1975 | Stefanik | 156/104 |
| 3,953,630 | 4/1976 | Roberts et al. | 428/81 |
| 4,046,933 | 9/1977 | Stefanik | 428/81 |
| 4,052,523 | 10/1977 | Rhodes et al. | 428/116 |

*Primary Examiner*—Paul J. Thibodeau
*Attorney, Agent, or Firm*—Morris A. Case; Bernard A. Donahue

[57] ABSTRACT

A graphite containing composite structure having a fastener area for joining the composite to other structures terminates the graphite reinforced laminate adjacent to the fastener area. Kevlar reinforced laminates abut the graphite laminate and extend over the fastener area and are further reinforced with Kevlar laminates that overlap the graphite then extend over the fastener area.

6 Claims, 2 Drawing Figures

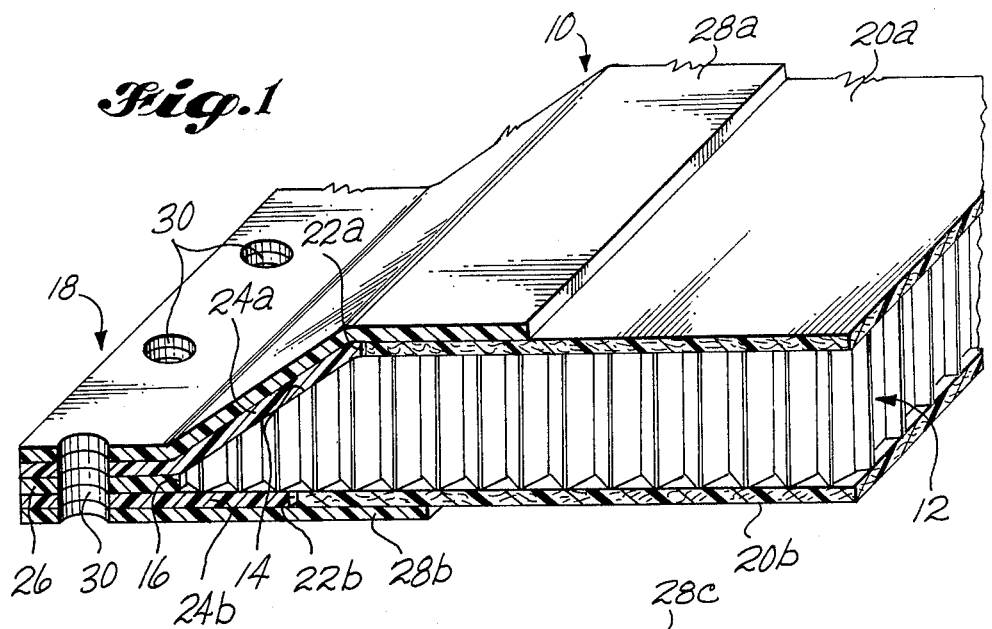

HYBRID COMPOSITE STRUCTURES

BACKGROUND OF THE INVENTION

Graphite reinforced laminated structures are well known and they provide a high strength-to-weight ratio to the structure. These fibers are being used more and more as structures for aircraft due to this high strength-to-weight ratio. However, graphite fibers present a problem in aircraft use as graphite, when physically contacted by or electrically coupled to aluminum, causes corrosion.

Aluminum fasteners are extensively used in aircraft, and all types of metal fasteners provide an electrical circuit that could electrically couple graphite containing laminates to aluminum aircraft structure.

SUMMARY OF THE INVENTION

A composite structure has graphite as the primary reinforcing material. In the composite, the graphite laminate terminates adjacent to, and before entering into, the fastening area of the composite. Laminates of Kevlar are used to cover the fastener area and to overlap the graphite laminate.

It is an object of this invention to provide a graphite reinforced composite that does not have any graphite in an area of the structure that utilizes fasteners for joining to other structures.

DESCRIPTION OF THE DRAWINGS

FIG. 1 shows a cabinet view of the invention.

FIG. 2 shows a cabinet view of a different embodiment of the invention.

DETAILED DESCRIPTION

The composite structure 10 has a honeycomb core 12 which is tapered down at 14 near edge 16. The core may be any of the many known materials used to make honeycomb with nylon honeycomb core preferred. Adjacent the edge of the core the composite has a fastener or joining area 18. A graphite reinforced laminate 20a covers one side of the core but terminates at a point 22a that is adjacent to, but short of, the fastener area. The graphite laminate may be made up with any of the known resins with an epoxy preferred. A second graphite reinforced laminate 20b covers the opposite side of the core and also terminates at 22b at a point adjacent to, but not in, the fastener area. Abutting the graphite laminate at 22a and 22b, respectively, are Kevlar reinforced laminates 24a and 24b. Kevlar is a trademark of the Dupont Company and refers to a composition consisting of an aramid. These laminates extend outward into, and become part of, the fastener of join area. These layers of reinforcing Kevlar may be joined together or may, as is shown here, contact a separate Kevlar laminate 26. A pair of Kevlar reinforced laminates 28a and 28b are located to cover the abutting Kevlar layers in the fastener area and to extend inward to overlap the graphite laminates.

Holes 30 for accepting fasteners are located in the join or fastener area to permit joining the composite to other structures.

FIG. 2 shows a different embodiment of a graphite reinforced composite structure with a honeycomb core 12a which is tapered down at 14a near edge 16a. The core is covered on each side with a Kevlar reinforced laminate. The Kevlar is preimpregnated with a resin, preferably epoxy, and a layer 32a is placed on the top side of the core and layer 32b is placed on the bottom side of the core. Each of these layers cover the core and extend to the side to form part of a joining or fastening area 18a. A graphite reinforced laminate 20c covers most of the Kevlar laminate in the core area but terminates at 22c adjacent to the join area, and another graphite reinforced laminate 20d covers most of the Kevlar laminate on the bottom side of the core area, but terminates at 22d adjacent to the join area. A pair of Kevlar reinforced laminates 24c and 24d abut laminates 20c and 20d, respectively, and extend over the join area. Kevlar reinforced laminates 28c and 28d are located to cover the abutting Kevlar laminates in the fastener area and to extend inward to overlap the graphite laminates.

I claim:

1. A lightweight composite structure having a honeycomb core and means for joining to other structures comprising: a honeycomb core, a layer of graphite reinforced on each side of the core with the layer terminating adjacent an area to be joined with a fastener, a layer of aramid reinforced resin abutting the graphite reinforced resin layer on each side of the honeycomb and extending over the join area, a layer of aramid reinforced resin to cover the join area and to overlap the graphite resin layer to form a composite structure, and holes through the fastening area for accepting fasteners to join the composite to other structures.

2. A lightweight aircraft composite structure for joining to other structures comprising: a honeycomb core, a graphite reinforced plastic covering each side of the core, the graphite reinforced layers each terminating adjacent an area on the structure for fastening to other structures, an aramid reinforced plastic abutting each graphite reinforced layer and extending to form part of the fastening area, a covering aramid reinforced plastic overlapping each graphite layer and covering the first aramid reinforced layers, and holes through the fastening area for accepting fasteners to join the composite to other structures.

3. A lightweight aircraft composite structure as in claim 2 further comprising: an additional layer of aramid reinforced plastic between the core and each of the graphite reinforced layers and extending into the fastening area.

4. A lightweight aircraft composite structure for joining to other structures comprising: a honeycomb core, a layer of aramid reinforced plastic covering each side of the core and extending to form part of a fastening area, a covering layer of graphite reinforced plastic that terminates short of the fastening area, a layer of aramid reinforced plastic abutting the graphite reinforced layer and extending over the fastening area, and a layer of aramid reinforced plastic covering the fastening area and overlapping the graphite reinforced layer to form an integrated composite structure free of graphite in the fastening area, and holes through the fastening area for accepting fasteners to join the composite structure to other structures.

5. A method of forming an aircraft composite structure for securing the composite to other structures with fasteners, with steps comprising: placing a covering layer of resin impregnated graphite over a honeycomb core with the graphite layers terminating adjacent a side of the core, abutting the covering layer with a layer of resin impregnated aramid that extends sidewise past the core and forming a fastening area, covering the fastening area with another aramid reinforced resin layer that partially overlaps the graphite layers, curing the layers forming a composite structure, and placing holes in the fastening area for securing to other structures with fasteners.

6. A method of forming an aircraft composite structure for securing the composite to other structures with fasteners, with steps comprising: placing a layer of resin impregnated aramid over each side of a honeycomb core and extending the layers past the core forming part of a fastening area, placing a layer of graphite and resin over each aramid layer and terminating the graphite layer adjacent the fastening area, covering the fastening area with another aramid reinforced resin layer that partially overlaps each graphite layer, curing the formed layers creating a composite structure, and placing holes in the fastening area for securing to other structures with fasteners.

* * * * *